Aug. 23, 1966    F. S. C. BRANCO    3,268,788
PHASE DIFFERENCE SPEED CONTROL SYSTEM
Filed Jan. 9, 1963    3 Sheets-Sheet 2

INVENTOR:
Flavio S. C. Branco

Attorneys

Aug. 23, 1966   F. S. C. BRANCO   3,268,788
PHASE DIFFERENCE SPEED CONTROL SYSTEM
Filed Jan. 9, 1963   3 Sheets-Sheet 3

Fig. 6

Input to Amp 16

Output from Amp 16

Output from Limiter 42

Output from Frequency Divider 44

Output from Oscillator 58

Output from Frequency Divider 60

Output from Pulse Former 48

Output from Pulse Former 68

Output from Reference Generator 54

Output from Phase Detector 52

Reference Potential

INVENTOR:
Flavio S. C. Branco
By Smyth, Roston & Pavitt
Attorneys

United States Patent Office 3,268,788
Patented August 23, 1966

3,268,788
PHASE DIFFERENCE SPEED CONTROL SYSTEM
Flavio S. C. Branco, Van Nuys, Calif., assignor to Minnesota Mining and Manufacturing Company, St. Paul, Minn., a corporation of Delaware
Filed Jan. 9, 1963, Ser. No. 250,274
28 Claims. (Cl. 318—314)

This invention relates to a control system for a transducing system. More specifically, the invention relates to a system for controlling the speed of a tape medium by controlling the rotation speed of a motor which drives the tape medium. For example, the invention broadly provides the recording of a reference signal on the tape medium in representation of the speed of the tape medium at the same time that information is recorded on the medium. This reference signal is used during the reproduction of the information previously recorded on the medium to control the speed of the motor and the tape medium during reproduction in duplication of the speed of the tape medium during recording.

The invention incorporates means for producing the reference signal and includes a tachometer structure connected within the motor. During reproduction the invention also includes circuitry for switching between the reference signal recorded on the tape medium and the reference signal developed by the tachometer. The switching to the reference signal developed by the tachometer is accomplished in accordance with conditions which defeat the appearance of the reference signal recorded on the tape medium. For example, as the motor starts up, the reference signal reproduced from the tape medium has variable characteristics until the speed of the tape medium stabilizes at the desired speed.

For example, the reference signal reproduced from the tape medium may be attenuated during certain periods and during these periods the speed control system is driven by the reference signal produced from the tachometer. Also, during reproduction the information and the reference signal may be missing due to physical irregularities or dirt and dust on the tape medium. These situations are referred to as dropouts and it is necessary at these times to use the reference signal produced by the tachometer to control the speed of the tape.

The speed of the tape is controlled by the use of a first control signal developed in accordance with the rotational speed of the motor driving the tape. The first control signal provides a rough indication of the speed of the tape and is used as a coarse signal to control the tape speed. A second fine control signal is produced by comparing a first pulse signal from the signal on the tape or from the tachometer and a second pulse signal derived from a reference oscillator.

The individual pulses within the two pulse signals have different pulse widths and the position of the narrower pulse within the wider pulse provides a phase comparison of the two pulse signals. An output signal is produced in accordance with the phase comparison of the two pulse signals and the amplitude of the output signal is in accordance with the speed of the driving motor. In order to facilitate the production of the output signal, the pulse signal having the individual pulses of the wider width controls the production of a ramp voltage and the pulse signal having the individual pulses of a narrower width controls the production of a shelf contained on the ramp voltage. The output signal is then produced in accordance with the voltage value of the shelf on the ramp and is used to provide a fine speed control over the motor.

The system of the present invention also incorporates means for starting the motor incorporated in the tape transport system without producing excessive stress and tension in the tape medium. The slow start of the motor is accomplished by connecting a variable voltage to the motor and then disconnecting the voltage from the motor when the control signals developed by the speed control system are sufficient to drive the motor at the desired speed.

Since the system of the present invention provides a tape transport system having essentially similar speed characteristics during both record and reproduce, the tape transport system has a very low time displacement error. That is, if two signals are recorded on the tape medium with a particular time displacement or distance on the tape between the signals, the two signals can be reproduced with an almost exact time displacement or distance between the signals. The low time displacement error is provided by the recording of the main reference signal on the tape and the subsequent use of the reference signal during reproduction to determine the speed of the tape. Also, the provision of an auxiliary reference signal from the tachometer provides a control signal when the main reference signal is missing. Therefore, the system of the present invention always maintains a positive control over the speed of the tape during both recording and reproduction so that the speed control of the tape is essentially uniform.

The invention will become clearer upon an examination of the following drawings wherein.

Figures 1, 2:
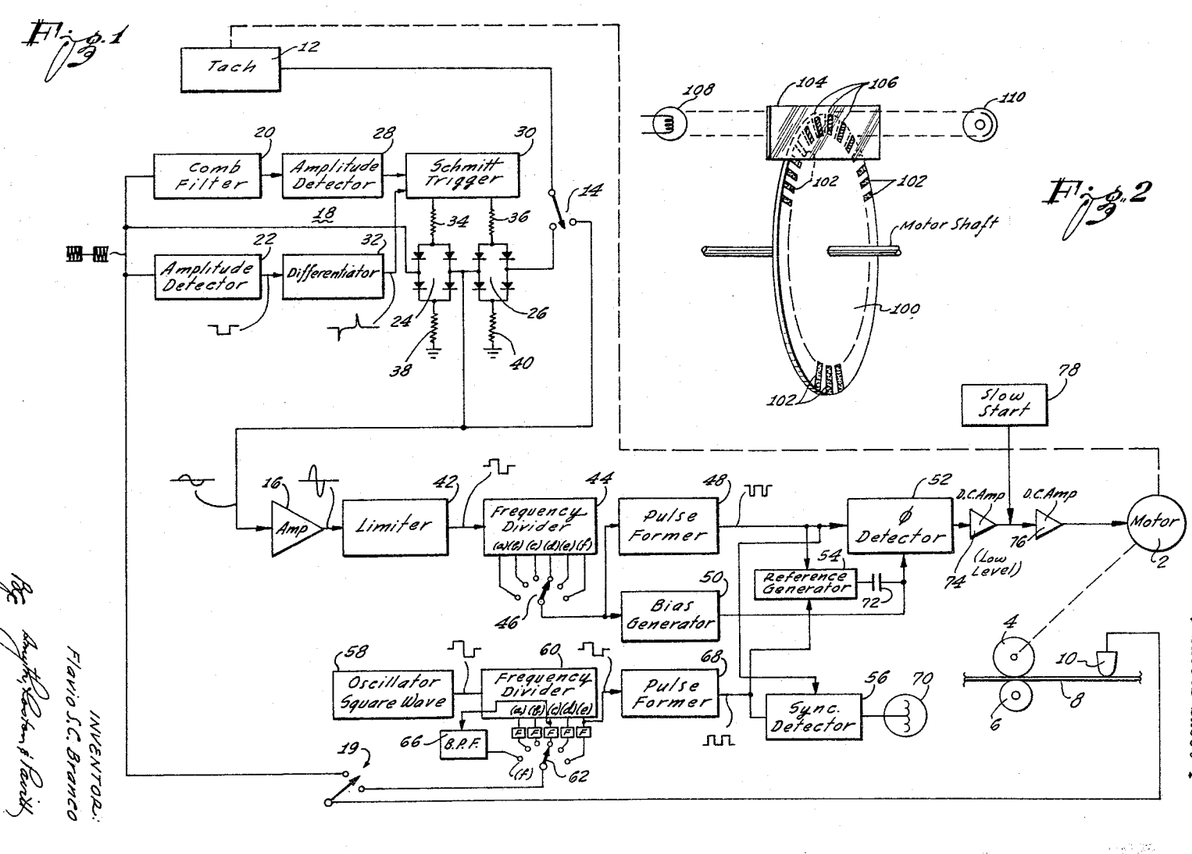
FIGURE 1 is a block diagram of a speed control system embodying the concepts of the present invention.
FIGURE 2 illustrates a mechanical arrangement constituting the tachometer included within the system of FIGURE 1.

In FIGURE 1 a motor 2 is part of a tape transport system. The motor 2, for example, would control a standard capstan drive including a capstan 4 and an idler wheel 6 to move a tape 8 in a longitudinal direction. Signals are recorded on or reproduced from the tape 8 by a head 10. A tachometer 12 is mechanically connected to the motor 2 to produce a signal in accordance with the speed of the motor 2. For example, as shown in FIGURE 2, the tachometer may be constructed by having a disc 100 mounted on the motor shaft to rotate at the same speed as the motor. The disc 100 may be made of a translucent material, for example, glass, and has at its outer extremity a series of opaque portions 102. The opaque portions alternate with areas of the disc 100 which are translucent. A translucent member 104 is constructed to operate as a reticle and contains opaque portions 106 corresponding to the opaque portions 102 on the disc 100.

A light source 108 is located adjacent to the disc 100 and member 104 and directs light through the disc 100 and member 104 to be detected by a photocell 110. As the disc 100 rotates, the combination of the opaque and translucent portions on the disc and member 104 produces a signal from the photocell 110 having a frequency in accordance with the speed of the disc 100. This occurs due to the operation of the opaque portions 106 and 102 continuously varying from an in-register position to an out-of-register position. The signal from the photocell 110, therefore, follows a sinusoidal pattern having a frequency in accordance with the speed of the disc 100. The tachometer structure shown in FIGURE 2, therefore, produces a signal having a speed in accordance with the speed of the motor 2, which speed reflects the speed of the tape 8.

The output from the tachometer 12 is applied to a switch 14. The switch may be either in a first or in a second position. In the first position the switch directly connects the tachometer 12 to an amplifier 16. In the second position the switch connects the tachometer 12 to a switching circuit 18. During the recording of information on the tape medium the switch 14 is in the first position and directly connects the output signal from the tachometer 12 to the input to the amplifier 16. Since there is no reference signal on the tape medium during the recording of information, the signal from the tachometer 12 is always used as a reference signal within the system of FIGURE 1 to control the speed of the motor 2.

During reproduction the signal from the tachometer 12 is applied to the switching circuit 18 and may be used at selected times to provide the reference signal. The tachometer signal is used in the speed control system when the signal on the tape medium is missing. At all other times the reference signal detected by the head 10 from the tape 8 is applied through a switch 19 to the switching circuit 18 and is used within the speed control signal. The reference signal on the tape was previously recorded on the tape during the recording of information. The recording of the reference signal on the tape will be explained later in conjunction with a subsequent portion of the control system.

The signal from the tape is applied to a comb filter 20, an amplitude detector 22 and a diode bridge 24. The signal from the tachometer 12 with the switch 14 in the second position is applied to a second diode bridge 26. The output from the comb filter 20 is coupled through an amplitude detector 28 as a first input to a Schmitt trigger 30. The output from the amplitude detector 22 is differentiated by the differentiator 32 and applied as a second input to the Schmitt trigger 30.

Either the input from the differentiator 32 or from the amplitude detector 28 may trigger the Schmitt trigger from one state to another. The Schmitt trigger 30 is provided with two output terminals of opposite polarities. Resistors 34 and 36 are electrically disposed between the two outputs from the Schmitt trigger and the diode bridges 24 and 26. The bridges are coupled through resistors 38 and 40 to a reference potential such as ground.

Figure 3A:
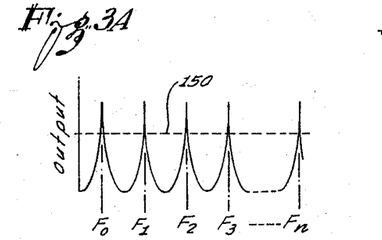
FIGURES 3A, 3B and 3C are curves used in explaining the switching circuitry included within the system of FIGURE 1.
Figure 3B:
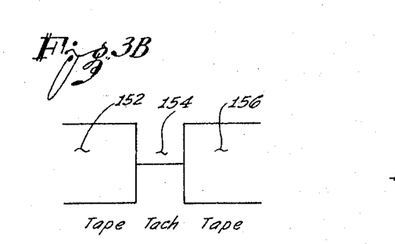
Figure 3C:
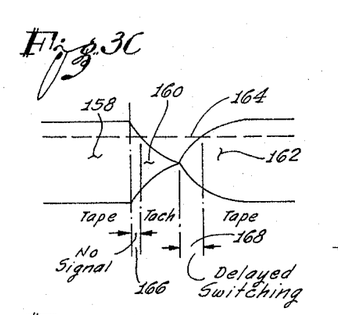

FIGURES 3A, 3B and 3C illustrate the operation of the above-described switching circuit 18 during the reproduction of information. The response of the comb filter 20 is illustrated in FIGURE 3A. The comb filter has a series of passbands related to each other by frequency multiples with each passband corresponding to a particular rotational speed of the motor and speed of travel of the tape medium. For example, if the tape medium is to move at a variety of speeds, for example, 7½, 15, 30, 60, 120 and 180 inches per second, the comb filter has a series of peaks each having a frequency related to the speed of movement of the tape medium.

The first peak is designated as $F_0$ and relates to a tape speed of 7½ inches per second. The second peak is designated as $F_1$ and relates to a tape speed of 15 inches per second. The subsequent peaks correspond to the remaining tape speeds and are designated as $F_2, F_3 \ldots F_N$. Upon the initial energizing of the motor 2, the tape 8 builds up its speed to the desired value. The head 10 detects the reference frequency recorded on the tape and since the tape has a variable speed until it reaches the desired value, the output from the head has a variable frequency. If, for example, the tape is to run at 15 inches per second, the output signal from the head is substantially attenuated by the comb filter 20 at all points excepting those corresponding to the peaks $F_0$ and $F_1$.

The amplitude of the signal passed by the comb filter is detected by the amplitude detector 28 and applied to the Schmitt trigger 30. If the Schmitt trigger has a trigger level indicated by the dotted line 150 in FIGURE 3A, the Schmitt trigger switches only on the peaks. Excepting at the peaks the outputs from the Schmitt trigger 30 produce a condition wherein the diode bridge 26 is biased to conduct and the diode bridge 24 is biased non-conductive. The signal from the tachometer 12, therefore, passes directly through the diode bridge 26 and is applied as an input signal to the amplifier 16. At the same time the signal from the tape is blocked by the diode bridge 24. When, however, the output from the comb filter is at a peak, the Schmitt trigger is triggered in an opposite direction to bias the diode bridge 24 conductive and the diode bridge 26 non-conductive. At this time the signal from the tape passes through diode bridge 24 to appear as an input signal to the amplifier 16. Conversely, the tachometer signal is blocked by the non-conductive nature of the bridge 26. The Schmitt trigger controls the diode bridges to switch back and forth from the tachometer to the tape until the desired tape speed is reached. When the tape is running at the proper speed, and if a reference signal is present on the tape, the Schmitt trigger maintains the signal from the tape to the amplifier 16.

However, there are dropouts on the tape and at these times the signal from the tape is missing. FIGURE 3B illustrates a condition wherein a dropout is present on the tape. Initially a signal having amplitude characteristics as illustrated at 152 is present from the tape and this signal is passed by the comb filter to maintain the Schmitt trigger at a proper polarity to pass the signal from the tape. When a dropout appears, as illustrated at 154, the signal is missing from the tape. During this time 154 a reference signal should be supplied by the tachometer. When the signal reappears, as illustrated at 156, the signal from the tape should again be passed by the switching circuit 18.

However, as will be seen with reference to FIGURE 3C, the signal passed by the comb filter 20 does not follow the amplitude characteristic of the reference signal on the tape. The comb filter 20 has an appreciable time delay and this alters the switching time in the switching circuit 18. This may be seen in FIGURE 3C where the first period of time 158 represents the same period of time 152 illustrated in FIGURE 3A. The second period of time 160 represents the output signal from the comb filter when there is a dropout on the tape and the period 162 represents the resumption of the reference signal on the tape. The dotted line 164 indicates the trigger level of the Schmitt trigger. When the dropout occurs, the output from the comb filter slowly decays until the trigger level 164 is reached. However, for a short period of time 166, the switching circuit 18 passes no signal since there is none present on the tape and since the tachometer is blocked by the diode bridge 26. Also, there is a period of time 168 where the resumption of the signal from the tape is delayed since the signal from the comb filter takes a period of time to build up to the trigger level.

The amplitude detector 22 and differentiator 32 are used to correct the delayed switching conditions. The amplitude detector 22 produces an output signal which detects the amplitude of the signal recorded on the tape. The amplitude detector, therefore, produces a square wave each time there is a dropout on the tape. The differentiator produces pulses at the leading and trailing edges of the square wave produced by the amplitude detector. The first pulse is used in the period 166 when no signal is passed by the switching circuit to trigger the Schmitt trigger 30 to transmit the signal produced by the tachometer to the amplifier 16. During the period 168 the second pulse from the differentiator 32 will reset the Schmitt trigger at an earlier time to allow a more rapid transition from the tachometer to the tape signal.

The amplifier 16 has a high gain to greatly increase the amplitude of the input to the amplifier. The output from the amplifier 16 is applied to a limiter 42. The square wave produced by the limiter 42 is applied to a frequency divider 44. The frequency divider 44 contains a plurality of counting circuits so as to provide a plurality of outputs marked (a) through (f). Each output corresponds to a particular speed of travel in the tape medium. For example, outputs (a) through (f) may consecutively represent tape speeds of 7½, 15, 30, 60, 120 and 180 inches per second.

The frequency of the input signal to the frequency divider 44 is dependent upon the frequency of the signal passed by the switching circuit 18. The various frequencies which may be applied to the binaries are 12.5, 25, 50, 100, 200 and 300 kilocycles which correspond in order with the tape speeds given above. The output from the frequency divider 44 is to be maintained at a constant frequency of 12.5 kilocycles. Each output of the frequency divider 44 is, therefore, designed to produce this frequency of 12.5 kilocycles for one of the different discrete frequency inputs. For example, an input of 100 kilocycles produces the proper output at terminal (d) since at terminal (d) the input signal has been divided by two three times.

The proper output from the binaries 44 is provided by a switch 46. The movable arm of the switch 46 is connected to a pulse former 48 and a bias generator 50. The pulse former 48 produces a pulse signal from the output signal of the frequency divider. The pulse signal has individual pulses of a 2-microsecond time duration with a time interval between successive pulses of 78 microseconds. This pulse signal is applied to a phase detector 52, a reference generator 54 and a sync detector 56.

A square wave oscillator 58 produces a 200-kilocycle square wave for application to a second frequency divider 60. The frequency divider 60 has a plurality of outputs (a) through (f). The frequency divider 60 subdivides the high frequency input of the oscillator 58 to smaller frequencies dependent upon the desired speed of the tape medium. The outputs (a) through (e) of the frequency divider 60 are used for tape speeds of 120, 60, 30, 15 and 7½ inches per second and the corresponding frequencies for these tape speeds are 200, 100, 50, 25 and 12.5 kilocycles. Each output passes through a low pass filter marked F to a switch 62 so that the output signals are sine waves. The sine waves are applied through the switch 62 to the switch 19 to record the sine waves on the tape 8 by the head 10. The sine waves are recorded at the same time that information is recorded and is subsequently used as the reference signal during the reproduction of the information.

Since it is also desired to provide a tape speed of 180 inches per second, it is, therefore, necessary to provide a reference frequency of 300 kilocycles. This is accomplished by connecting a bandpass filter 66 to the output (b) of the frequency divider 60. At the output (b) a square wave of 100 kilocycles is present. Since a square wave of 100 kilocycles has a very high third harmonic frequency content, the bandpass filter 66 is tuned to approximately 300 kilocycles to pass the third harmonic as an output signal of 300 kilocycles. This signal is provided as an output at point (f) on the switch 62.

Output point (e) of the frequency divider which contains a square wave of 12.5 kilocycles is directly connected to a pulse former 68. Pulse former 68 produces a pulse signal with the individual pulses in the pulse signal having a time duration of 5 microseconds and with a time period between successive pulses of 75 microseconds. The pulse signal produced by the pulse former 68 is connected to the reference generator 54 and the sync detector 56. An output light 70 is connected to the sync detector 56 to indicate when the pulse signals produced by the pulse former 48 and the pulse former 68 are in synchronism. The output from the reference generator 54 is applied through a coupling capacitor 72 to the phase detector 52. Also, the output signal from the bias generator 50 is applied to the phase detector 52.

The output from the phase detector 52 is coupled through a low-level amplifier 74 and applied to a power amplifier 76. The power amplifier 76 produces a sufficient output to drive the motor 2. A slow start circuit 78 is also connected to the input to the power amplifier 76 to provide the initial starting of the motor 2.

The actual control of the speed of the motor is the same during both record and reproduce except certain auxiliary functions are different. For example, during the recording of information on the tape medium the switch 14 is in a position to apply the signal from the tachometer 12 directly to the amplifier 16. Also, switches 46 and 62 have their movable arms connected to the appropriate output terminals of the frequency dividers 44 and 60 to provide the desired speed of the tape. Finally, the switch 19 is in the position to record the reference track on the tape 8 by the head 10. During reproduction of information, the switches 14 and 19 are reversed so that the input to the amplifier 16 is from the switching circuit 18 and so that the reference signal recorded on the tape 8 is detected by the head 10 and applied as an input signal to the switching circuit 18.

Figure 4:
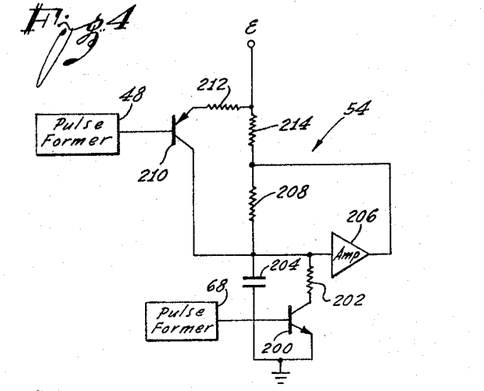
FIGURE 4 is a schematic diagram of the reference generator included within the system of FIGURE 1.
Figure 4A:
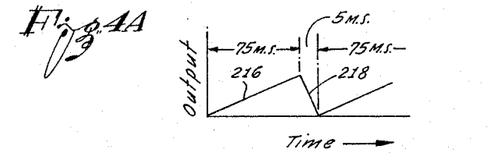
FIGURES 4A and 4B are curves illustrating the relationship between voltage and time of certain of the voltage waveforms produced at strategic terminals in the system shown in FIGURE 1.
Figure 4B:
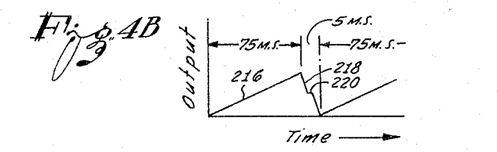

The signal from the amplifier 16 and limiter 42 is coupled through the frequency divider 44 and applied to the bias generator 50 to provide a rough indication of the frequency of the motor 2. The bias generator is a counting circuit which provides a variable amplitude signal dependent upon the frequency of the signal applied to the bias generator. The bias generator 50 is then used to bias the phase detector 52 to a particular level in accordance with the frequency of the motor. The pulse signals formed by the pulse former 48 and the pulse former 68 are both applied to the reference generator 54. FIGURES 4, 4A and 4B illustrate the structure and operation of the reference generator.

In FIGURE 4 the 5-microsecond pulse signal produced by the pulse former 68 is applied to the base of a transistor 200. The emitter of the transistor 200 is connected to a reference potential such as ground and the collector is coupled through a resistor 202 to the input of an amplifier 206. The amplifier 206 is connected in a bootstrap circuit by having a capacitor 204 disposed between the input of the amplifier 206 and a reference potential such as ground and by having a resistor 208 connected across the input and output terminals of the amplifier 206. The 2-microsecond pulse signal produced by the second pulse former 48 is applied to the base of a second transistor 210. The collector of the transistor 210 is connected to the input to the amplifier 206. The emitter of the transistor 210 is connected to a source of voltage E through a resistor 212. The source of voltage E is also applied to the output terminal of the amplifier 206 through a second resistor 214.

During the absence of the 5-microsecond pulses produced by the pulse former 68, the transistor 200 is biased non-conductive. The voltage E starts to charge the capacitor 204 to produce a variable input to the amplifier 206. The amplifier 206 amplifies the input signal, and the output signal from the amplifier 206 is applied to one terminal of the resistor 208 to provide a further charging of the capacitor 204. This bootstrap operation insures a linear charging of the capacitor 204 so that the output from the amplifier 206 may also follow a linear curve. This may be seen in the portion of the curve marked 216 in FIGURES 4A and 4B.

Upon the appearance of the 5-microsecond pulses, the transistor 200 is biased conductive to discharge the capacitor 204. This is illustrated by the portion of the curve marked 218 in FIGURES 4A and 4B. The application of the 2-microsecond pulse signal from the pulse former 48 changes the output signal produced by the circuit of FIGURE 4 in the manner shown in FIGURE 4B. Upon the appearance of the 2-microsecond pulse the transistor 210 is biased conductive to provide an increased charging current to the capacitor 204. The resistors of the circuit are properly apportioned so that the increased charging current offsets the discharging of the capacitor 204 for 2 microseconds during the 5-microsecond discharge period. This produces a 2-microsecond shelf 220 as shown in FIGURE 4B.

This voltage produced by the reference generator as shown in FIGURE 4B is applied to the phase detector 52. The 2-microsecond pulse is also applied to the phase detector 52 and the 2-microsecond pulse gates the phase detector 52 to pass an error signal. Since the shelf on the signal produced by the reference generator and the gating of the phase detector are both determined by the 2-microsecond pulse, the gating of the phase detector is in synchronism with the appearance of the shelf and the output from the phase detector is a D.C. voltage which is representative of the height of the shelf. The phase detector 52 is also biased by the bias generator 50 so that the resultant D.C. error signal produced by the phase detector is representative of the both coarse and fine errors of speed of the motor 2. Slight changes in speed of the motor are reflected by changes in phase of the input signals to the phase detector 52 and the reference generator 54 and the shelf 220 illustrated in FIGURE 4B moves up and down along the 5-microsecond long sloping curve 218 to produce a smaller or greater D.C. error voltage from the phase detector 52 in accordance with the speed of the motor. The error signal is then passed by the low-level amplifier 74 and applied to the power amplifier 76 to control the speed of the motor 2.

Figure 5:
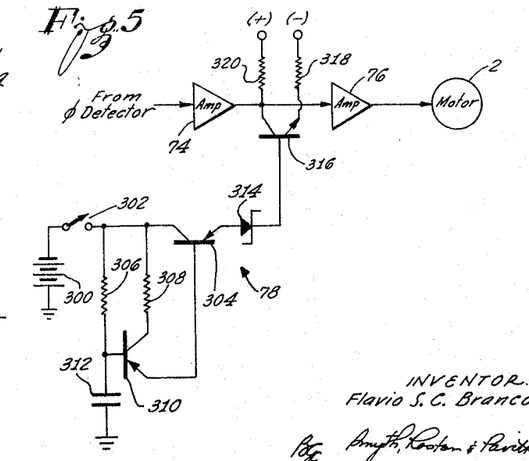
FIGURE 5 is a schematic diagram of the slow start circuit included within the system of FIGURE 1.

During the initial start of the tape transport system there is no error signal produced to control and drive the motor 2. Therefore, it is necessary to provide a voltage to the amplifier 76 which starts the motor 2 and brings it up to a speed close to the desired speed. This is provided by a slow start circuit 78. A schematic of the slow start circuit 78 plus associated circuitry is shown in FIGURE 5. The power to start the motor 2 is provided by a source of voltage 300. The source of voltage is coupled through a switch 302 to the collector of a transistor 304. A pair of resistors 306 and 308 are electrically disposed between the collector of the transistor 304 and the base and collector of a transistor 310. The emitter of the transistor 310 is connected to the base of the transistor 304 and a capacitor 312 is connected between the base of the transistor 310 and a reference potential such as ground. A Zener diode 314 is disposed between the emitter of the transistor 304 and the base of a transistor 316. The emitter of the transistor 316 is coupled through a resistor 318 to a negative source of voltage and the collector of the transistor 316 is coupled through a resistor 320 to a positive source of voltage. The output of the amplifier 74 is applied to the collector of the transistor 316 and to the power amplifier 76.

The slow start circuit 78 operates as follows: When the switch 302 is closed, the source of voltage 300 starts to charge the capacitor 312 through the resistor 306. The transistor 310 draws current in accordance with the charge on the capacitor 312. Since the emitter of the transistor 310 is connected to the base of the transistor 304, the transistor 304 also draws current in accordance with the charge on the capacitor 312. The voltage 300, therefore, passes through the transistor 304 in a slowly charging pattern as shown by curve 322 in FIGURE 5A. The output from the transistor 304 is coupled through the Zener diode and applied to the power amplifier 76 through the transistor 316 of the motor.

Figure 5A:
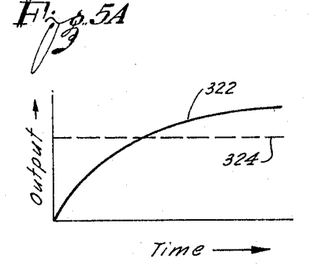
FIGURE 5A is a curve used in explaining the slow start circuit of FIGURE 5.
Figure 6:
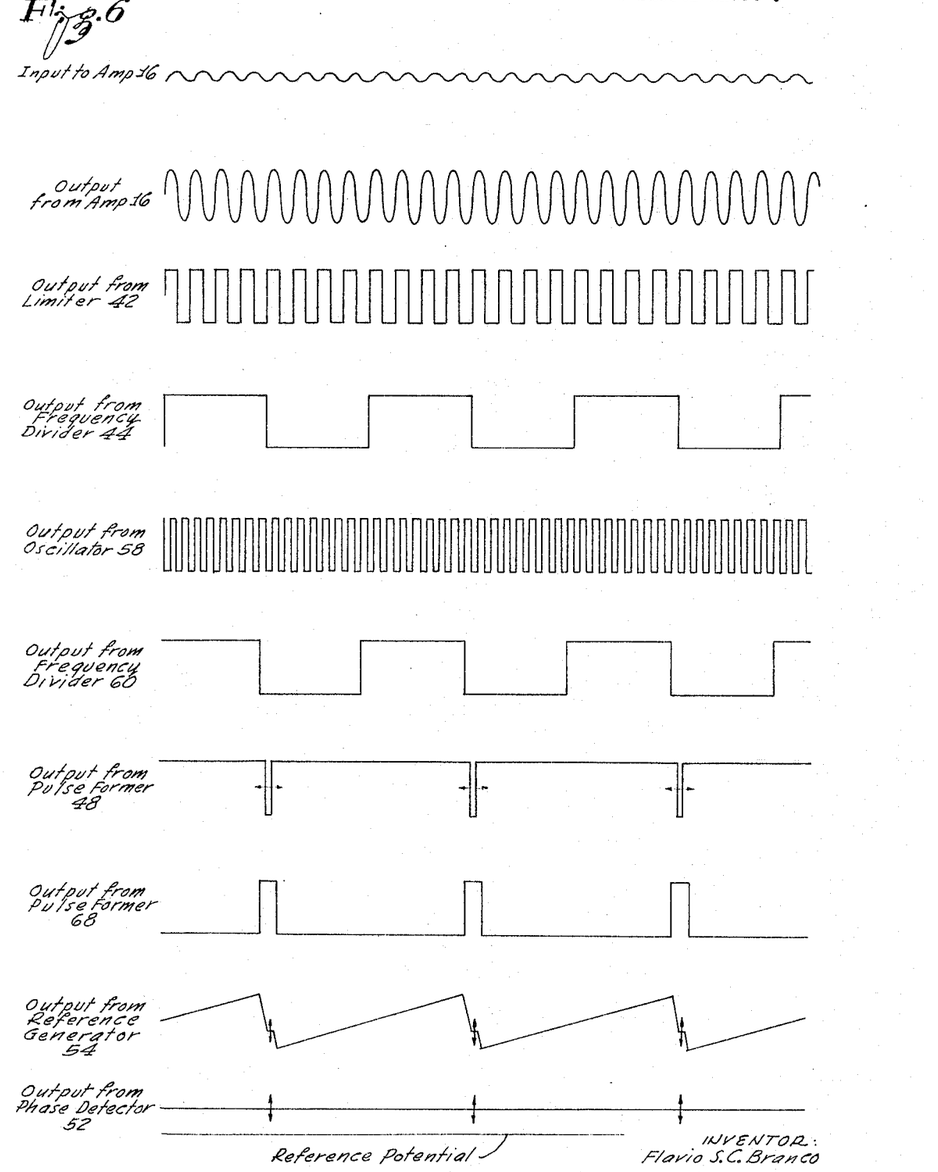
FIGURE 6 is a group of curves illustrating the output signal from the various components shown in FIGURE 1 on a common time axis.

The speed of the motor slowly increases since the speed of the motor is dependent upon the voltage 322 applied to the motor. When the voltage, as illustrated in FIGURE 5A, reaches a critical point, illustrated by the dotted line 324, the Zener diode 314 cuts off the slow start circuit from the input to the amplifier 76. However, at this time the motor 2 has already been brought up to a sufficient speed so that the control signal has been developed by the system illustrated in FIGURE 1. This control signal is applied to the amplifier 74 which drives the amplifier 76.

The slow start circuit is used to initially start the motor 2 running, since there is no other signal present from the control circuit. The slow starting of the motor 2 is also important since a large voltage applied to the motor would result in a high torque applied to the tape medium. This could either break or stretch the tape medium.

It will be appreciated that this application has been described with reference to particular embodiments, but it is appreciated that other adaptations and modifications may be made and the invention, therefore, is only to be limited by the appended claims.

What is claimed is:

1. In combination in a system for producing a reference signal to regulate the speed of a motor means controlling the movement of the medium wherein the medium has a first reference signal recorded on the medium,
   first means operatively coupled to the medium for detecting the first reference signal recorded on the medium during first periods of time and for blocking the first reference signal during second periods of time,
   second means operatively coupled to the motor means for producing a second reference signal in accordance with the speed of the motor means, and
   third means operatively coupled to the first and second means for passing the first reference signal detected by the first means during the first periods of time that the first means detects the first reference signal and for passing the second reference signal produced by the second means during the second periods of time that the first means blocks the first reference signal.

2. The combination of claim 1 additionally including means operatively coupled to the third means for passing the second reference signal at additional periods of time when the first reference signal is missing from the medium.

3. In combination in a system for producing a reference signal to control the speed of a motor means to drive a recording medium wherein the recording medium has contained thereon a first reference signal,
   first means operatively coupled to the recording medium for detecting the first reference signal recorded on the medium,
   filter means operatively coupled to the first means and having a selected bandpass to pass the first reference signal when the first reference signal has frequency values related to the desired speed of movement of the recording medium and to block the first reference signal when the first reference signal has frequency values unrelated to the desired speed,
   second means operatively coupled to the motor means for producing a second reference signal having characteristics in accordance with the speed of the motor means,
   switch means operatively coupled to the filter means in the first state of operation of the switch means to pass the first reference signal when the filter means passes the first reference signal and operatively coupled to the second means in the second state of operation of the switch means to pass the second reference signal produced by the second means when the filter means blocks the first reference signal, and
   third means operatively coupled to the switch means for detecting the reference signal passed by the switch means.

4. The combination of claim 3 wherein additional means are provided to detect the absence of the first reference signal on the recording medium and to immediately switch the switch means to the second state to pass the second reference signal.

5. In combination in a system for regulating the speed of a movable member,
    first means responsive to the movable member for developing an output signal having characteristics dependent upon the speed of the movable member,
    second means for producing at a particular frequency first pulses having variable characteristics with time and with each of the first pulses having a pulse width of a first particular value,
    third means operatively coupled to the first means for producing second pulses and with each of the second pulses having a pulse width of a second particular value different from the first particular value and with each of the second pulses occurring at a different time relative to the first pulses in accordance with slight variations in the speed of the medium,
    fourth means operatively coupled to the third means for combining the first and second pulses to produce a composite pulse having characteristics dependent upon the characteristics of the first and second pulses and having a variable amplitude of the composite pulses during the period of the second pulses and in accordance with the amplitude of the second pulses and the amplitude of the first pulses during the period of the second pulses,
    fifth means operatively coupled to the third and fourth means and responsive to the second and composite pulses for producing an error signal having characteristics in accordance with the amplitude of the composite pulses during the period of the second pulses, and
    sixth means operatively coupled to the fifth means and to the movable member for controlling the speed of the movable member in accordance with the characteristics of the error signal.

6. In combination in a system for regulating the speed of a movable medium,
    motor means movable at a variable speed and operatively coupled to the medium for providing a movement of the medium at a speed dependent upon the speed of the motor means,
    second means for producing at a particular frequency first pulses having variable amplitude characteristics with time and having a pulse width of a first particular value,
    third means operatively coupled to the motor means for producing second pulses with each of the second pulses having a pulse width of a second particular value different from the first paricular value and having a variable time relative to the first pulses in accordance with slight variations in the speed of movement of the medium,
    fourth means operatively coupled to the second and third means for producing a composite pulse having amplitude characteristics in accordance with the characteristics of the first and second pulses during the period of the second pulses,
    fifth means operatively coupled to the third and fourth means and responsive to the second and composite pulses for comparing the individual ones of the second pulses with corresponding individual ones of the composite pulses and for producing an output signal having characteristics in accordance with the relative amplitude of the composite pulses during the period of the second pulses, and
    sixth means operatively coupled to the fifth means and to the motor means for controlling the speed of the motor means in accordance with the characteristics of the output signal.

7. In combination in a system for regulating the speed of a movable medium,
    motor means movable at a variable speed and operatively coupled to the medium for providing a movement of the medium at a speed dependent upon the speed of the motor means,
    second means for producing at a particular frequency first pulses having variable characteristics with time and having a pulse width of a first particular value,
    third means operatively coupled to the motor means for producing second pulses with each of the second pulses having a pulse width of a second particular value different from the first particular value and having a variable time relative to the first pulses in accordance with slight variations in the speed of movement of the medium,
    fourth means operatively coupled to the second and third means and responsive to the first and second pulses for comparing the individual ones of the first pulses with corresponding individual ones of the second pulses and for producing an output signal having characteristics in accordance with the displacement of the second pulses relative to the first pulses,
    fifth means operatively coupled to the fourth means and to the motor means for controlling the speed of the motor means in acordance with the characteristics of the output signal, and
    sixth means operatively coupled to the motor means for providing a slow starting of the motor means.

8. The combination of claim 7 additionally including means for disconnecting the slow starting means from the motor means when the motor means reaches a particular speed.

9. In combination in a system for regulating the speed of a movable member,
    first means responsive to the movable member for developing an output signal having characteristics dependent upon the speed of the movable member,
    second means for producing at a particular frequency first pulses having the characteristics of a voltage ramp and with each of the first pulses having a pulse width of a first particular value,
    third means operatively coupled to the first means for producing second pulses and with each of the second pulses having a pulse width of a second particular value different from the first particular value and with each of the second pulses occurring at a variable time along the voltage ramp in accordance with slight variations in the speed of the medium,
    fourth means operatively coupled to the second and third means and responsive to the first pulses for developing a voltage ramp having a continuously varying magnitude and a constant width and a shelf at the position of the second pulses and with the width of the voltage ramp dependent upon the width of the individual ones of the first pulses,
    fifth means operatively coupled to the third and fourth means for producing an error signal having a magnitude at each instant in accordance with the magnitude of the voltage ramp at the time of occurrence of the second pulses, and
    sixth means operatively coupled to the fifth means and to the movable member for varying the speed of the movable member in accordance with the characteristics of the error signal.

10. In combination in a system for regulating the speed of a movable member,
    first means responsive to the movable member for developing an output signal having characteristics dependent upon the speed of the movable member,
    second means for producing at a particular frequency first pulses having variable characteristics with time and with each of the first pulses having a pulse width of a first particular value,
    third means operatively coupled to the first means for producing second pulses and with each of the second pulses having a pulse width of a second particular value different from the first particular value and with each of the second pulses occurring at a variable time relative to the first pulses in accordance with slight variations in the speed of the movable member, fourth means operatively coupled to the second and third means for producing a voltage ramp having a variable magnitude and a constant width and with the width of the voltage ramp dependent upon the width of the pulses in the first pulse signal and with the voltage ramp containing a shelf of a constant width at a position corresponding to the production of the second pulses and with the magnitude of the shelf dependent upon the magnitude of the first and second pulses during the production of the second pulses, fifth means operatively coupled to the fourth means for producing an error signal having characteristics in accordance with the amplitude of the shelf of the voltage ramp, and sixth means operatively coupled to the fifth means and to the movable member for controlling the speed of the movable member in accordance with the characteristics of the error signal.

11. In combination in a system for regulating the speed of a movable medium, first means movable at a variable speed and operatively coupled to the medium for providing a movement of the medium in accordance with the speed of the first means, second means operatively coupled to the first means for producing first output signals having characteristics in accordance with the speed of the first means, third means for producing at a particular frequency first pulses having variable characteristics with time and with each of the first pulses having a pulse width of a first particular value, fourth means operatively coupled to the first means for producing second pulses at the particular frequency with variations in time relative to the first pulses dependent upon slight variations in the speed of the medium, each of the second pulses having a pulse width of a second particular value different from the first particular value, fifth means operatively coupled to the third and fourth means and responsive to the first and second pulses for combining the individual ones of the first pulses with corresponding individual ones of the second pulses to produce a composite signal having an amplitude at each instant dependent upon the combined amplitudes of the first and second pulses, sixth means operatively coupled to the fourth and fifth means for producing second output signals having characteristics in accordance with the amplitudes of the composite pulses during the production of the second pulses, and seventh means operatively coupled to the second means and the sixth means for combining the output signals produced by the second means and sixth means to produce a composite error signal, and eighth means operatively coupled to the seventh means and to the first means for controlling the speed of the first means in accordance with the characteristics of the composite error signal.

12. In combination in a system for regulating the speed of a movable medium, first means movable at a variable speed and operatively coupled to the medium for providing a movement of the medium in accordance with the speed of the first means, second means operatively coupled to the first means for producing an output signal having characteristics in accordance with the speed of the first means, third means for producing first pulses having ramp voltage characteristics and having a pulse width of a particular value, fourth means operatively coupled to the first means for producing second pulses with each of the second pulses having a pulse width of a second particular value different from the first particular value and occurring at a variable time relative to the first pulses in accordance with variations in the speed of the medium, fifth means operatively coupled to the third and fourth means for producing a voltage ramp having a constant width and with the width of the voltage ramp dependent upon the width of the first pulses and the voltage ramp containing a shelf having width dependent upon the width of the second pulses and with the amplitude of the shelf having characteristics dependent upon the amplitude characteristics of the first and second pulses during the period of the second pulses, sixth means operatively coupled to the fifth means for producing an enrror signal having characteristics dependent upon the amplitude of the shelf on the voltage ramp, seventh means operatively coupled to the second and sixth means for producing a composite error signal in accordance with the output signal of the second means and the error signal of the sixth means, and eighth means operatively coupled to the seventh means and to the first means for controlling the speed of the first means in accordance with the characteristics of the composite error signal.

13. In combination in a system for regulating the speed of a movable medium during the reproduction of information from the medium in accordance with a reference signal recorded on the medium, first means operatively coupled to the medium for providing a movement of the medium, second means operatively coupled to the first means for producing first pulses having variable characteristics with time and having a pulse width of a first particular value, third means for reproducing the reference signal from the medium at each instant at a frequency dependent upon the speed of the medium at that instant, fourth means operatively coupled to the third means and responsive to the reference signal for producing second pulses with each of the second pulses having a pulse width of a second particular value different from the first particular value and occurring at a variable time relative to the first pulses in accordance with variations in the frequency of the reference signal reproduced from the medium, fifth means operatively coupled to the second and fifth means and responsive to the first and second pulses for combining individual ones of the first pulses with corresponding individual ones of the second pulses and for producing an output signal having characteristics during the periods of the second pulses in accordance with the amplitudes of the first and second pulses during the period of the second pulses, and sixth means operatively coupled to the fifth means and to the fourth means for controlling the speed of the first means in accordance with the characteristics of the output signal during the production of the second pulse.

14. In combination in a system for regulating the speed of a movable member at a plurality of discrete speeds, first means responsive to the movable member for developing an output signal having discrete frequencies in accordance with the discrete speeds of the movable member, second means operatively coupled to the first means for subdividing the discrete frequencies of the output signal produced by the first means by a particular value dependent upon the discrete frequencies to produce a control signal having a frequency dependent upon the speed of the movable member, third means operatively coupled to the second means for producing first pulses having variable time spacings in accordance with the characteristics of the control signal developed by the second means and with each of the first pulses having a pulse width of a first particular value, fourth means for producing second pulses at a particular frequency and with each of the second pulses having a pulse width of a second particular value different from the first particular value and with each of the second pulses occurring at a variable time relative to the first pulses in accordance with variable time spacings of the first pulses, fifth means operatively coupled to the third and fourth means and responsive to the first and second pulses for combining the first and second pulses to produce composite pulses having amplitude characteristics dependent upon the amplitude characteristics of the first and second pulses, sixth means operatively coupled to the fourth and fifth means for producing an error signal having characteristics in accordance with the amplitude of the composite pulses during the production of the second pulses, and seventh means operatively coupled to the sixth means and to the movable member for controlling the speed of the movable member in accordance with the characteristics of the error signal.

15. In combination in a system for regulating the speed of a medium containing a first reference signal during the reproduction of information on the medium, first means movable at a variable speed and operatively coupled to the medium for providing a movement of the medium in accordance with the speed of the first means, second means operatively coupled to the medium for detecting the first reference signal on the medium, third means operatively coupled to the second means for passing the first reference signal during first periods of time in accordance with the production of first characteristics for the first reference signal and for blocking the first reference signal during second periods of time in accordance with the production for the first reference signal of second characteristics different from the first characteristics, fourth means operatively coupled to the first means for producing a second reference signal having characteristics dependent upon the speed of the first means, fifth means operatively coupled to the third and fourth means for passing the first reference signal during the first periods of time and for passing the second reference signal during the second periods of time, sixth means operatively coupled to the fifth means for producing first pulses having a first particular duration and occurring at each instant at spaced intervals dependent upon the frequency characteristics of the reference signal passed by the fourth means at that instant, seventh means for producing second pulses having a pulse width of a second particular duration different from the first particular duration and occurring at a particular frequency, a particular one of the sixth and seventh means being constructed to provide pulses with a variable amplitude and with a greater duration than the pulses from the other one of the sixth and seventh means, eighth means operatively coupled to the sixth and seventh means and responsive to the first and second pulses for producing output signals having characteristics in accordance with the amplitude of the pulses of longer duration at the time of occurrence of the pulses of shorter duration, and ninth means operatively coupled to the eighth means and to the first means for controlling the speed of the first means in accordance with the characteristics of the output signals.

16. The combination of claim 15 additionally including means operatively coupled to the fourth means and the fifth means for obtaining the passage of the second reference signal through the fifth means at additional periods of time when the first reference signal is missing from the medium.

17. In combination in a system for regulating the speed of a movable medium, motor means movable at a variable speed and operatively coupled to the medium for providing a movement of the medium in accordance with the speed of the motor means, second means operatively coupled to the motor means for producing a first output signal having frequency characteristics dependent upon the speed of the motor means, the second means including tachometer means operatively coupled to the motor means for movement with the motor means and having first and second segments alternatively disposed on the tachometer means to provide the first output signal with the frequency characteristics in accordance with the speed of the motor means, third means disposed relative to the medium for producing a second output signal at a frequency dependent upon the speed of movement of the medium, fourth means operatively coupled to the second and third means for passing the first output signal at first periods of time and for passing the second output signal at second periods of time in accordance with variations in particular characteristics of the second output signal, fifth means operatively coupled to the fourth means and responsive to the output signal passing through the fourth means for producing first pulses occurring at variable intervals dependent upon variations in the frequency of such output signal and with each of the first pulses having a pulse width of a first particular value, sixth means for producing second pulses with each of the second pulses having a pulse width of a second particular value different from the first particular value and occurring at a particular frequency, a particular one of the fifth and sixth means being constructed to provide the pulses from that means with voltage ramp characteristics and with a greater duration than the pulses from the other one of the fifth and sixth means, seventh means operatively coupled to the fifth and sixth means and responsive to the first and second pulses for producing an error signal having characteristics in accordance with the magnitude of the voltage ramp in the pulses of longer duration at the time of occurrence of the pulses of shorter duration, and eighth means operatively coupled to the seventh means and to the motor means for controlling the speed of the motor means in accordance with the characteristics of the error signal.

18. In combination in a system for regulating the speed of a movable medium, first electrical circuitry means for providing a movement of the movable medium at a variable speed, second electrical circuitry means for providing clock pulses at a particular frequency and having a first particular duration, third electrical circuitry means operatively coupled to the movable medium for providing a first signal at a variable phase and frequency dependent upon the speed of movement of the movable medium at each instant, fourth electrical circuitry means operatively coupled to the third electrical circuitry means for converting the first signal into second pulses having a second particular duration different from the first particular duration and occurring at variable time intervals dependent upon the phase and frequency of the control signal, the third and fourth electrical circuitry means being constructed to provide for a particular one of the clock pulses and second pulses in each pair a sawtooth waveform and a greater duration than the other pulse in each pair, fifth electrical circuitry means operatively coupled to the second and fourth electrical circuitry means for producing an error signal having characteristics dependent upon the amplitude of the particular one of the clock pulses and second pulses in each pair at the time of occurrence of the other pulse in each pair, and sixth electrical circuitry means operatively coupled to the first and fifth electrical circuitry means for obtaining variations in the speed of the movable medium by the first means in accordance with the characteristics of the error signal.

19. In combination in a system for regulating the speed of a movable medium, first means for providing a movement of the movable medium at a variable speed, second means for providing reference pulses at a particular frequency and with a particular duration, third means operatively coupled to the medium for providing a control signal having at each instant a frequency and phase variable relative to the particular frequency in accordance with variations in the speed of the movable medium, fourth means operatively coupled to the third means for producing control pulses at variable instants of time in accordance with variations in the phase and frequency of the control signal, the third and fourth means being constructed to provide one of the reference and control pulses in each pair with ramp characteristics and with a greater duration than the other pulse in each pair, fifth means operatively coupled to the third and fourth means for producing an error signal having characteristics in accordance with the magnitude of the ramp voltage in the particular one of the pulses in each pair at the time of occurrence of the other pulse in the pair, and sixth means operatively coupled to the first and fifth means for obtaining variations in the movement of the movable medium by the first means in accordance with variations in the characteristics of the error signals.

20. In combination in a system for regulating the speed of a movable medium, first means responsive to movements of the movable medium for developing a first signal having at each instant phase and frequency characteristics dependent upon the speed of the movable medium at that instant, second means operatively coupled to the first means for producing first pulses having a first particular period and occurring at variable time intervals related to variations in the phase and frequency of the first signal, third means for providing reference pulses at a particular frequency and with a second particular period different from the first particular period to provide variations in the relative times of occurrence of the first and second pulses in accordance with variations in the time intervals of the first pulse, the second and third means being constructed to provide a particular one of the first and second pulses in each pair with a variable amplitude during the period of that pulse and with a greater duration than the other pulse in each pair, fourth means operatively coupled to the second and third means for producing an error signal having characteristics dependent upon the amplitude of the particular one of the pulses in each pair at the time of occurrence of the other pulse in the pair, fifth means for providing a movement of the movable medium at a variable speed, and sixth means operatively coupled to the fourth and fifth means for varying, in accordance with variations in the characteristics of the error signal, the speed at which the fifth means drives the movable member.

21. In combination in a system for regulating the speed of a movable medium, first means responsive to movements of the movable medium for developing an output signal having phase and frequency characteristics dependent upon variations in the speed of the movable member, second means coupled to the first means for producing at a particular frequency first pulses having characteristics in accordance with the characteristics of the output signal developed by the first means and with each of the first pulses having a pulse width of a first particular value, third means for producing second pulses at a particular frequency and a variable time relationship to the first pulses in accordance with variations in the phase characteristics of the output signal and having a second particular width greater than the first particular width and having a variable amplitude during each of the pulses, fourth means responsive to the first and second pulses for producing an error signal having characteristics dependent upon the amplitude of the second pulses at the time of occurrence of the first pulses, fifth means for driving the movable member, and sixth means operatively coupled to the fourth and fifth means for varying, in accordance with variations in the characteristics of the error signal, the speed at which the fifth means drives the movable member.

22. In combination in a system for regulating the speed of a movable medium, first means for providing a movement of the movable medium at a variable speed, second means operatively coupled to the movable medium for providing a first signal having a variable frequency and phase dependent upon the speed of movement of the movable medium at each instant, third means operatively coupled to the second means for converting the first signal into first pulses having a first particular duration and occurring at variable time intervals dependent upon variations in the phase and frequency of the first signal, fourth means for providing second pulses having a particular duration and a particular frequency, a particular one of the third and fourth means being constructed to provide a variable amplitude for the particular one of the first and second pulses in each pair from that particular means and a greater duration for that pulse than the other pulse in the pair, fifth means operatively coupled to the second, third and fourth means and responsive to the first signal from the second means for providing a first error signal upon deviations in the frequency of the first signal from the particular frequency and responsive to the first and second pulses upon deviations in the phase of the first signal from a particular value for providing a second error signal having characteristics dependent upon the amplitude of the particular one of the first and second pulses in each pair upon the occurrence of the other pulse in the pair, and sixth means operatively coupled to the first and fifth means for varying the speed of the movable medium as obtained by the first means in accordance with the characteristics of the first and second error signals from the fifth means.

23. In the combination set forth in claim 22, the particular one of the third and fourth means being constructed to provide the pulses from that means with a sawtooth voltage.

24. In combination in a system for controlling the movement of a medium wherein the medium has a reference signal recorded on the medium,
- first means movable at a variable speed and operatively coupled to the medium for driving the medium in accordance with the movements of the first means,
- second means operatively coupled to the first means for producing first signals at a variable frequency dependent upon the movements of the first means,
- third means disposed relative to the medium for reproducing the reference signals recorded on the medium and for reproducing such reference signals at each instant at a frequency dependent upon the speed of the movable medium at that instant,
- fourth means having first and second operative relationships and operatively coupled to the second and third means to pass the first signals from the second means in the first operative relationship and to pass the reference signals from the third means in the second operative relationship,
- fifth means operatively coupled to the third means for obtaining the production of a signal of first characteristics upon the production of reference signals below a first amplitude by the third means and for obtaining the production of a signal of second characteristics upon the production of reference signals at least equal to the particular amplitude by the third means,
- sixth means operatively coupled to the fourth and fifth means for obtaining the operation of the fourth means in the first relationship upon the passage of a signal of the first characteristics through the fifth means and for obtaining the operation of the fourth means in the second relationship upon the passage of a signal of the second characteristics through the fifth means,
- seventh means for providing second signals at a particular frequency,
- eighth means operatively coupled to the sixth and seventh means for producing an error signal having characteristics dependent upon the relative times of occurrence of the second signals and the signals passing through the fourth means, and
- ninth means operatively coupled to the first and eighth means for obtaining variations in the speed of movement of the first means in accordance with variations in the characteristics of the error signal from the eighth means.

25. In combination in a system for controlling the movement of a medium wherein the medium has a reference signal recorded on the medium,
- first means movable at a variable speed and operatively coupled to the medium for driving the medium in accordance with the movements of the first means,
- second means operatively coupled to the first means for producing first signals at a variable frequency dependent upon the movements of the first means,
- third means disposed relative to the medium for reproducing the reference signals recorded on the medium and for reproducing such reference signals at each instant at a frequency dependent upon the speed of the movable medium at that instant,
- fourth means having first and second operative relationships and operatively coupled to the second and third means to pass the first signals from the second means in the first operative relationship and to pass the reference signals from the third means in the second operative relationship,
- fifth means operatively coupled to the third means for obtaining the production of a signal of first characteristics upon the production of reference signals below a first amplitude by the third means and for obtaining the production of a signal of second characteristics upon the production of reference signals at least equal to the particular amplitude by the third means,
- sixth means operatively coupled to the fourth and fifth means for obtaining the operation of the fourth means in the first relationship upon the passage of a signal of the first characteristics through the fifth means and for obtaining the operation of the fourth means in the second relationship upon the passage of a signal of the second characteristics through the fifth means,
- seventh means for providing first pulses at a particular frequency and with a first particular duration,
- eighth means operatively coupled to the fourth means for providing second pulses of a second particular duration different from the first particular duration with a variable phase relative to the first pulses in accordance with variations in the phase of the signal from the fourth means,
- a particular one of the seventh and eighth means being constructed to provide the pulses from that means with a variable amplitude during the duration of the pulses and to provide such pulses with a greater duration than the pulses from the other one of the seventh and eighth means,
- ninth means operatively coupled to the seventh and eighth means for producing an error signal having variable characteristics dependent upon the amplitude of the pulses from the particular one of the seventh and eighth means at the time of occurrence of the pulses from the other one of the seventh and eighth means, and
- tenth means operatively coupled to the first and ninth means for obtaining variations in the speed of movement of the first means in accordance with variations in the characteristics of the error signal from the eighth means.

26. In the combination set forth in claim 25, the ninth means being operatively coupled to the fourth means to provide the error signal with variable characteristics representing deviations in the speed of the movable means on a coarse basis from a desired value.

27. In combination in a system for controlling the movement of a medium wherein the medium has a reference signal recorded on the medium,
- first electrical circuitry means movable at a variable speed and operatively coupled to the medium for driving the medium in accordance with variations of the movement of the first electrical circuitry means,
- second electrical circuitry means operatively coupled to the first electrical circuitry means for producing first signals at a variable frequency dependent upon the movement of the first electrical circuitry means,
- third electrical circuitry means disposed relative to the medium for reproducing the reference signals recorded on the medium and for reproducing such reference signals at each instant at a frequency dependent upon upon the speed of the movable medium at that instant,
- fourth electrical circuitry means having first and second operative relationships and operatively coupled to the second and third electrical circuitry means to pass the first signals from the second electrical circuitry means in the first operative relationship and to pass the reference signals from the second electrical circuitry means in the second operative relationship,
- fifth electrical circuitry means operatively coupled to the third electrical circuitry means for obtaining the production of signals of first characteristics upon the production of reference signals at substantially a particular frequency by the third electrical circuitry means and for obtaining the production of signals of second characteristics upon the production by the third electrical circuitry means of reference signals different from substantially the particular frequency, sixth electrical circuitry means operatively coupled to the fourth and fifth means for obtaining the operation of the fourth electrical circuitry means in the first relationship upon the passage of the signal of the second characteristics through the sixth electrical circuitry means and for obtaining the operation of the fourth electrical circuitry means in the second relationship upon the passage of the signal of the first characteristics through the fifth electrical circuitry means, seventh electrical circuitry means for providing second signals at a particular frequency, eighth electrical circuitry means operatively coupled to the sixth and seventh electrical circuitry means for producing an error signal having characteristics dependent upon the relative times of occurrence of the second signals and the signals passing through the fourth electrical circuitry means, and ninth electrical circuitry means operatively coupled to the first and eighth electrical circuitry means for obtaining variations in the speed of movement of the medium by the first electrical circuitry means in accordance with variations in the characteristics of the error signal from the eighth electrical crcuitry means.

28. In combination in a system for controlling the movement of a medium wherein the medium has a reference signal recorded on the medium, first electrical circuitry means movable at a variable speed and operatively coupled to the medium for driving the medium in accordance with variations of the movement of the first electrical circuitry means, second electrical circuitry means operatively coupled to the first electrical circuitry means for producing first signals at a variable phase and frequency dependent upon the movement of the first electrical circuitry means, third electrical circuitry means disposed relative to the medium for reproducing the reference signals recorded on the medium and for reproducing such reference signals at each instant at a phase and frequency dependent upon the speed of the movable medium at that instant, fourth electrical circuitry means having first and second operative relationships and operatively coupled to the second and third electrical circuitry means to pass the first signals from the second electrical circuitry means in the first operative relationship and to pass the reference signals from the second electrical circuitry means in the second operative relationship, fifth electrical circuitry means operatively coupled to the third electrical circuitry means for obtaining the production of signals of first characteristics upon the production of reference signals at substantially a particular frequency by the third electrical circuitry means and for obtaining the production of signals of second characteristics upon the production by the third electrical circuitry means of reference signals different from substantially the particular frequency, sixth electrical circuitry means operatively coupled to the fourth and fifth means for obtaining the operation of the fourth electrical circuitry means in the first relationship upon the passage of the signal of the second characteristics through the sixth electrical circuitry means and for obtaining the operation of the fourth electrical circuitry means in the second relationship upon the passage of the signal of the first characteristics through the fifth electrical circuitry means, seventh electrical circuitry means for providing first pulses at a particular frequency and with a first particular duration, eighth electrical circuitry means operatively coupled to the fourth electrical circuitry means for providing second pulses of a second particular duration different from the first particular duration and with a variable phase relative to the first pulses in accordance with variations in the phase of the signal from the fourth electrical circuitry means, a particular one of the seventh and eighth electrical circuitry means being constructed to provide the pulses from that electrical circuitry means with a ramp voltage during the duration of the pulses and to provide such pulses with a greater duration than the pulses from the other one of the seventh and eighth electrical circuitry means, ninth electrical circuitry means operatively coupled to the seventh and eighth electrical circuitry means for producing an error signal having variable characteristics dependent upon the amplitude of the pulses from the particular one of the seventh and eighth electrical circuitry means means at the time of occurrence of the pulses from the other one of the seventh and eighth electrical circuitry means, and tenth electrical circuitry means operatively coupled to the first and ninth electrical circuitry means for obtaining variations in the speed of movement of the medium by the first electrical circuitry means in accordance with variations in the characteristics of the error signal from the eighth electrical circuitry means.

References Cited by the Examiner

UNITED STATES PATENTS

| | | | |
|---|---|---|---|
| 1,976,355 | 10/1934 | Mees et al. | 318—313 |
| 2,886,757 | 5/1959 | Johnson | 318—318 |
| 2,905,876 | 9/1959 | Hillman | 318—327 |
| 3,005,940 | 10/1961 | Johnson | 318—314 |
| 3,089,061 | 5/1963 | Nieweboer | 318—318 |
| 3,096,444 | 7/1963 | Seward | 318—313 |
| 3,097,267 | 7/1963 | Clark | 318—314 |

ORIS L. RADER, *Primary Examiner.*

S. GORDON, J. C. BERENZWEIG, *Assistant Examiners.*